United States Patent
Ohno et al.

(10) Patent No.: US 10,857,848 B2
(45) Date of Patent: Dec. 8, 2020

(54) ELECTROMAGNETIC SUSPENSION DEVICE

(71) Applicant: HONDA MOTOR CO., LTD., Tokyo (JP)

(72) Inventors: Satoshi Ohno, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 236 days.

(21) Appl. No.: 15/954,005

(22) Filed: Apr. 16, 2018

(65) Prior Publication Data

US 2018/0297433 A1 Oct. 18, 2018

(30) Foreign Application Priority Data

Apr. 17, 2017 (JP) .................................. 2017-081153

(51) Int. Cl.
| | | |
|---|---|---|
| *B60G 17/015* | (2006.01) | |
| *B60G 17/016* | (2006.01) | |
| *B60G 17/02* | (2006.01) | |
| *B60G 17/018* | (2006.01) | |

(52) U.S. Cl.
CPC ....... *B60G 17/0157* (2013.01); *B60G 17/016* (2013.01); *B60G 17/018* (2013.01); *B60G 17/02* (2013.01); *B60G 2400/204* (2013.01); *B60G 2600/26* (2013.01)

(58) Field of Classification Search
None
See application file for complete search history.

(56) References Cited

U.S. PATENT DOCUMENTS

| | | | | |
|---|---|---|---|---|
| 5,619,413 A | * | 4/1997 | Oakley | B60G 17/017 280/5.514 |
| 2004/0150361 A1 | * | 8/2004 | Hio | F16F 15/035 318/375 |
| 2014/0260233 A1 | * | 9/2014 | Giovanardi | F15B 13/0444 60/431 |
| 2016/0121905 A1 | * | 5/2016 | Gillingham | B60W 10/06 701/37 |

FOREIGN PATENT DOCUMENTS

JP  2010-132222 A  6/2010

* cited by examiner

*Primary Examiner* — Todd Melton
*Assistant Examiner* — Jason R Roberson
(74) *Attorney, Agent, or Firm* — Rankin, Hill & Clark LLP (57) ABSTRACT

An electromagnetic suspension device includes: an electromagnetic actuator that generates a driving force related to vibration damping of a vehicle body by an electric motor; a rotational angle acquisition unit that acquires a rotational angle of the electric motor; a rotational angle acceleration calculation unit that calculates a rotational angle acceleration of the electric motor based on the rotational angle; ECU that performs driving force control including inertia compensation control of the electromagnetic actuator based on the rotational angle acceleration; and a relative speed calculation unit that acquires a relative speed between above- and below-spring members. In an area in which a relative speed exceeds a predetermined relative speed threshold, the ECU corrects an amount of inertia compensation so that the amount of inertia compensation is decreased, as compared with an area in which a relative speed value is the relative speed threshold or less.

4 Claims, 8 Drawing Sheets

ELECTROMAGNETIC SUSPENSION DEVICE

BACKGROUND OF THE INVENTION

1. Field of the Invention

The present invention relates to an electromagnetic suspension device including an electromagnetic actuator that is disposed along with a spring member installed between a vehicle body and a wheel of a vehicle, and that generates a driving force related to vibration damping of the vehicle body.

2. Description of the Related Art

An electromagnetic suspension device has conventionally been known which includes an electromagnetic actuator that is provided in parallel with a spring member installed between a vehicle body and a wheel of a vehicle, and that generates a driving force related to vibration damping of the vehicle body by an electric motor (see, for example, Japanese Unexamined Patent Application Publication No. 2010-132222). In addition to an electric motor, the electromagnetic actuator includes a ball screw mechanism. The electromagnetic actuator operates to generate a driving force related to vibration damping of the vehicle body by converting rotary motion of the electric motor into linear motion of the ball screw mechanism.

In the electromagnetic actuator, an inertial component that accompanies driving of a rotor incorporated in the electric motor, an inertial component that accompanies driving of the ball screw mechanism, and the like are factors that degrade damping characteristics. Thus, the electromagnetic suspension device disclosed in Japanese Unexamined Patent Application Publication No. 2010-132222 has an inertia compensation control function of calculating an internal inertial force based on a stroke acceleration, and reducing the effect of an inertial component that accompanies driving of constituent members of the electromagnetic actuator based on the calculated internal inertial force. With the electromagnetic suspension device having the inertia compensation control function, it is possible to reduce deterioration of damping characteristics caused by an inertial component that accompanies driving of constituent members of the electromagnetic actuator, and to improve the ride quality of a vehicle.

SUMMARY OF THE INVENTION

However, the electromagnetic suspension device described in Japanese Unexamined Patent Application Publication No. 2010-132222 obtains a stroke acceleration, which is a parameter referred to when the inertia compensation control is performed, by differentiating a stroke quantity twice with respect to time, the stroke quantity being calculated based on a rotational angle signal of an electric motor (refer to paragraphs 0018 to 0019 in Japanese Unexamined Patent Application Publication No. 2010-132222). In general, for instance, the drive circuit of an electric motor is formed using a switching element, and thus electromagnetic noise is inevitably generated. Thus generated electromagnetic noise is added to a rotational angle signal of the electric motor. Then, in the process of performing differential processing twice with respect to time on the stroke quantity calculated based on the rotational angle signal of the electric motor, the electromagnetic noise added to the rotational angle signal (stroke quantity) of the electric motor is amplified, and vibration noise of the vehicle body may be amplified. As a result, a problem arises in that it is difficult to achieve both the effect of improving the ride quality of the vehicle based on the inertia compensation control of the electromagnetic actuator and the effect of reducing the vibration noise of the vehicle body at a high level.

The present invention has been made in consideration of the actual situation, and an object thereof is to provide an electromagnetic suspension device that, even when inertia compensation control is in operation, is capable of achieving both the effect of improving the ride quality of the vehicle based on the inertia compensation control and the effect of reducing the vibration noise of the vehicle body at a high level.

In order to achieve the above-described object, an aspect of the invention provides an electromagnetic suspension device which is primarily characterized by including: an electromagnetic actuator that is disposed along with a spring member installed between a vehicle body and a wheel of a vehicle, and that generates a driving force related to vibration damping of the vehicle body; a state quantity acquisition unit that acquires a state quantity related to the electromagnetic actuator; a driving force controller that performs driving force control including inertia compensation control of the electromagnetic actuator based on the state quantity acquired by the state quantity acquisition unit; and a relative speed correlation value acquisition unit that acquires a correlation value of a relative speed between an above-spring member and a below-spring member with respect to the spring member in the vehicle body. The driving force controller performs driving force control including inertia compensation control of the electromagnetic actuator based on a derivative value of the state quantity, and in an area in which the relative speed correlation value acquired by the relative speed correlation value acquisition unit exceeds a predetermined relative speed correlation threshold, the driving force controller corrects an amount of inertia compensation by the inertia compensation control so that the amount of inertia compensation is decreased, as compared with an area in which the relative speed correlation value is less than or equal to the relative speed correlation threshold.

According to the present invention, even when inertia compensation control is in operation, it is possible to achieve both the effect of improving the ride quality of the vehicle based on the inertia compensation control and the effect of reducing the vibration noise of the vehicle body at a high level.

DETAILED DESCRIPTION OF THE EMBODIMENTS

Hereinafter, an electromagnetic suspension device according to an embodiment of the present invention will be described in detail with reference to the accompanying drawings as appropriate. It is to be noted that in the drawings illustrated below, the same members or corresponding members are labeled with the same reference symbol. Also, the size and shape of each member may be deformed or exaggerated and schematically shown for the purpose of illustration.

Figure 1:
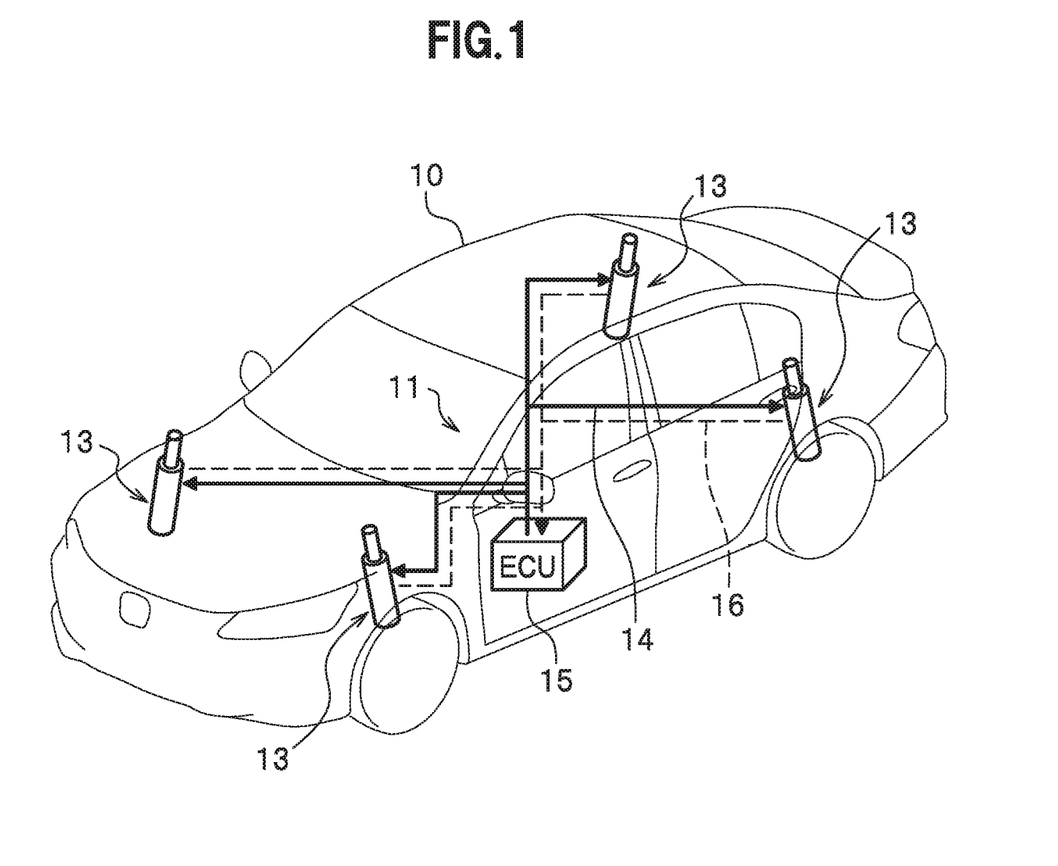
FIG. 1 is an entire configuration diagram of an electromagnetic suspension device according to an embodiment of the present invention.
Figure 2:
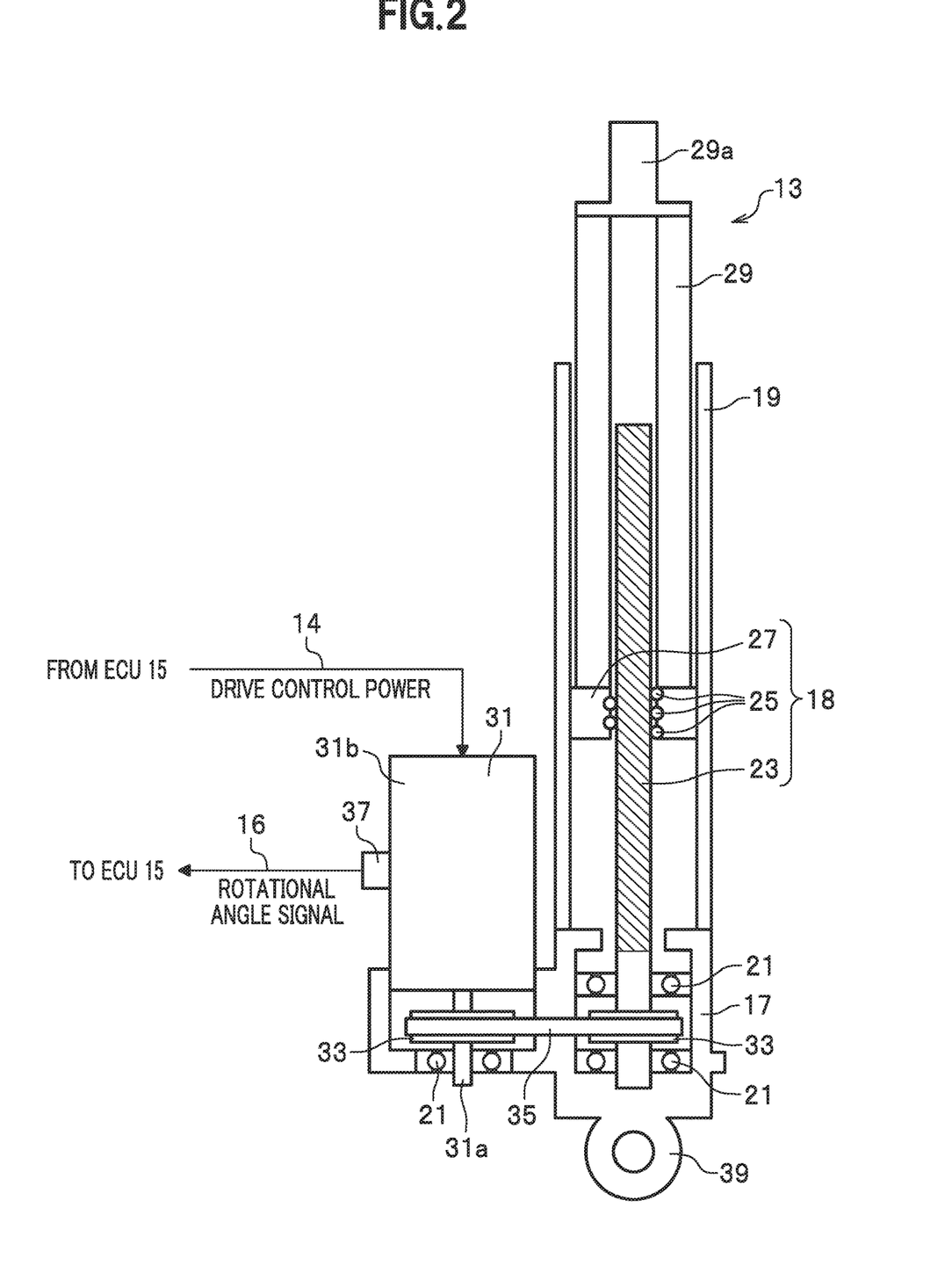
FIG. 2 is a partial cross sectional view of an electromagnetic actuator included in the electromagnetic suspension device.

Overview of Electromagnetic Suspension Device 11 According to Embodiment of Present Invention First, an overview of electromagnetic suspension device 11 according to an embodiment of the present invention will be described with reference to FIGS. 1 and 2. FIG. 1 is an entire configuration diagram of the electromagnetic suspension device 11 according to an embodiment of the present invention. FIG. 2 is a partial cross sectional view of an electromagnetic actuator 13 which constitutes part of the electromagnetic suspension device 11.

As illustrated in FIG. 1, the electromagnetic suspension device 11 according to the embodiment of the present invention includes multiple electromagnetic actuators 13 installed in each wheel of a vehicle 10, and one electronic control unit (hereinafter referred to as an "ECU") 15. The multiple electromagnetic actuators 13 and the ECU 15 are connected to each other via a power supply line 14 (see the solid line of FIG. 1) for supplying drive control power from the ECU 15 to the multiple electromagnetic actuators 13, and a signal line 16 (see the dashed line in FIG. 1) for sending a rotational angle signal of an electric motor 31 (see FIG. 2) from the multiple electromagnetic actuators 13 to the ECU 15. In the embodiment, the electromagnetic actuator 13 is disposed in each of the wheels including the front wheels (the left front wheel and the right front wheel), and the rear wheels (the left rear wheel and the right rear wheel), that is, four electromagnetic actuators 13 are disposed.

Each of the multiple electromagnetic actuators 13 has a common configuration in this embodiment. Thus, the configuration of one electromagnetic actuator 13 will be described rather than all the multiple electromagnetic actuators 13.

As illustrated in FIG. 2, the electromagnetic actuator 13 includes a base housing 17, an outer tube 19, a ball bearing 21, a ball screw shaft 23, multiple balls 25, a nut 27, and an inner tube 29.

The base housing 17 supports the base-end side of the ball screw shaft 23 rotatably around an axis via the ball bearing 21. The outer tube 19 is provided in the base housing 17, and houses a ball screw mechanism 18 including the ball screw shaft 23, the multiple balls 25, and the nut 27. The multiple balls 25 roll along a screw groove of the ball screw shaft 23. The nut 27 is engaged with the ball screw shaft 23 via the multiple balls 25, and converts rotary motion of the ball screw shaft 23 to linear motion. The inner tube 29 connected to the nut 27 is displaced in the axial direction of the outer tube 19 integrally with the nut 27.

In order to transmit a rotational driving force to the ball screw shaft 23, the electromagnetic actuator 13 includes an electric motor 31, a pair of pulleys 33, and a belt 35 as illustrated in FIG. 2. The electric motor 31 is provided in the base housing 17 to be parallel with the outer tube 19. One of the pulleys 33 is mounted in each of a motor shaft 31a of the electric motor 31 and the ball screw shaft 23. A belt member 35 for transmitting a rotational driving force of the electric motor 31 to the ball screw shaft 23 is suspended over the pair of pulleys 33.

The electric motor 31 is provided with a resolver 37 that detects a rotational angle signal of the electric motor 31. A rotational angle signal of the electric motor 31 detected by the resolver 37 is sent to the ECU 15 via the signal line 16. The rotation drive of the electric motor 31 is controlled according to drive control power which is supplied to each of the multiple electromagnetic actuators 13 by the ECU 15 via the power supply line 14.

In the embodiment, as illustrated in FIG. 2, the length of the electromagnetic actuator 13 in the axial direction is reduced by adopting a layout in which the motor shaft 31a of the electric motor 31 and the ball screw shaft 23 are disposed substantially in parallel and connected. However, a layout may be adopted, in which the motor shaft 31a of the electric motor 31 and the ball screw shaft 23 are coaxially disposed and connected.

In the electromagnetic actuator 13 according to the embodiment, as illustrated in FIG. 2, the lower end of the base housing 17 is provided with a connection portion 39. The connection portion 39 is connected and fixed to a below-spring member (such as a lower, a knuckle on the wheel side) which is not illustrated. On the other hand, an upper end 29a of the inner tube 29 is connected and fixed to an above-spring member (such as a strut tower portion on the vehicle body side) which is not illustrated. In short, the electromagnetic actuator 13 is disposed along with spring members, which are not illustrated, between the vehicle body and the wheel of the vehicle 10.

The electromagnetic actuator 13 configured as described above operates as follows. Specifically, for instance, a case is discussed, in which momentum related to upward vibration is inputted to the connection portion 39 from the wheel side of the vehicle 10. In this case, the inner tube 29 and the nut 27 are going to integrally move downward to the outer tube 19 to which the momentum related to upward vibration is applied. In response, the ball screw shaft 23 tends to rotate in a direction for downward movement of the nut 27. At this point, a rotational driving force of the electric motor 31 is generated in a direction to prevent the downward movement of the nut 27. The rotational driving force of the electric motor 31 is transmitted to the ball screw shaft 23 via the belt 35. In this manner, the vibration which is going to be transmitted from the wheel side to the vehicle body side is damped by applying a reaction force (damping force) against the momentum associated with upward vibration to the ball screw shaft 23.

Internal Configuration of ECU 15

Figure 3:
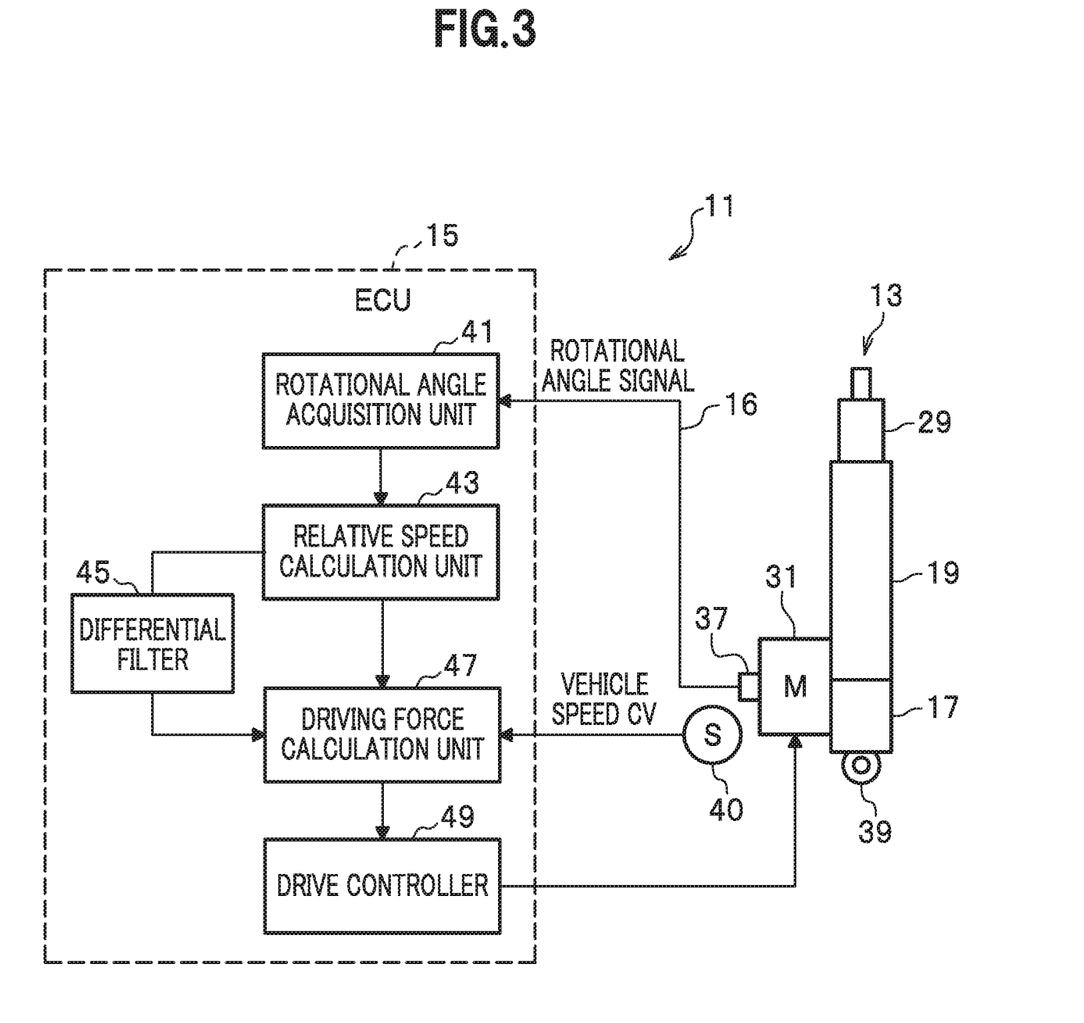
FIG. 3 is an internal configuration diagram of an ECU included in the electromagnetic suspension device.

Next, the internal configuration of the ECU 15 included in the electromagnetic suspension device 11 will be described with reference to FIG. 3. FIG. 3 is an internal configuration diagram of the ECU 15 included in the electromagnetic suspension device 11.

The ECU 15 includes a microcomputer that performs various types of arithmetic processing. The ECU 15 has a driving force control function of generating a driving force for damping vibration of the vehicle body by drive-controlling each of the multiple electromagnetic actuators 13 based on a rotational angle signal of the electric motor 31 detected by the resolver 37. The ECU 15 corresponds to the "driving force controller" of the present invention.

In order to achieve such a driving force control function, the ECU 15 includes a rotational angle acquisition unit 41, a relative speed calculation unit 43, a differential filter 45, a driving force calculation unit 47, and a drive controller 49 as illustrated in FIG. 3.

It is to be noted that the rotational angle acquisition unit 41, the relative speed calculation unit 43, and the differential filter 45 correspond to the "state quantity acquisition unit" of the present invention. Also, the rotational angle, the rotational angle speed, the rotational angle acceleration of the electric motor 31, the later-described "relative speed", "relative acceleration" and stroke speed of the ball screw shaft 23 are each included in the concept of "state quantity according to the electromagnetic actuator 13". Furthermore, the "differential value of state quantity" of the present invention refers to the rotation angle acceleration, "relative acceleration" of the electric motor 31.

The rotational angle acquisition unit 41 acquires a rotational angle signal of the electric motor 31 detected by the resolver 37. The rotational angle signal of the electric motor 31 acquired by the rotational angle acquisition unit 41 is sent to the relative speed calculation unit 43.

The relative speed calculation unit 43 calculates a relative speed between the above-spring member and the below-spring member of the vehicle 10 (hereinafter may be simply referred to as a "relative speed") by differentiating the rotational angle of the electric motor 31 acquired by the rotational angle acquisition unit 41 with respect to time. Incidentally, thus calculated relative speed has a strong correlation with the stroke speed of the ball screw shaft 23 and the rotational angle speed of the electric motor 31. In other words, the relative speed may be used as a replacement for the stroke speed of the ball screw shaft 23, and the rotational angle speed of the electric motor 31. The relative speed signal calculated by the relative speed calculation unit 43 is sent to both the differential filter 45 and the driving force calculation unit 47.

The differential filter 45 basically receives input of a relative speed signal calculated by the relative speed calculation unit 43, and performs differential filter processing, in which a predetermined gain frequency characteristics (high pass characteristics) is set, on the relative speed signal, thereby outputting a relative acceleration signal. The relative acceleration signal outputted from the differential filter 45 is sent to the driving force calculation unit 47. The differential filter 45 may be configured of an analog circuit or of a digital circuit.

The function of the differential filter 45 according to a modification will be described in detail later.

The driving force calculation unit 47 receives input of a relative speed signal and a relative acceleration signal, and a vehicle speed CV which is a vehicle speed of the vehicle 10, and calculates a driving force control signal as a target by referring to these signals and the latter-described damping force map 51, inertia compensation map 53, and inertia correction ratio map 55. The driving force control signal as a target, which is a calculation result of the driving force calculation unit 47, is sent to the drive controller 49.

The contents of calculation performed by the driving force calculation unit 47 will be described in detail later. Also, the driving force calculation unit 47 changes the magnitude of inertia correction amount according to whether or not the vehicle speed CV detected by a vehicle speed sensor 40 (see FIG. 3) exceeds a predetermined vehicle speed threshold CVth. The will be described in detail later.

The drive controller 49 supplies drive control power to the electric motor 31 included in each of the multiple electromagnetic actuators 13 in accordance with the driving force control signal sent from the driving force calculation unit 47, thereby performing drive control of each of the multiple electromagnetic actuators 13 independently. It is to be noted that when drive control power to be supplied to the electric motor 31 is generated, for instance, an inverter control circuit may be preferably used.

Figure 4:
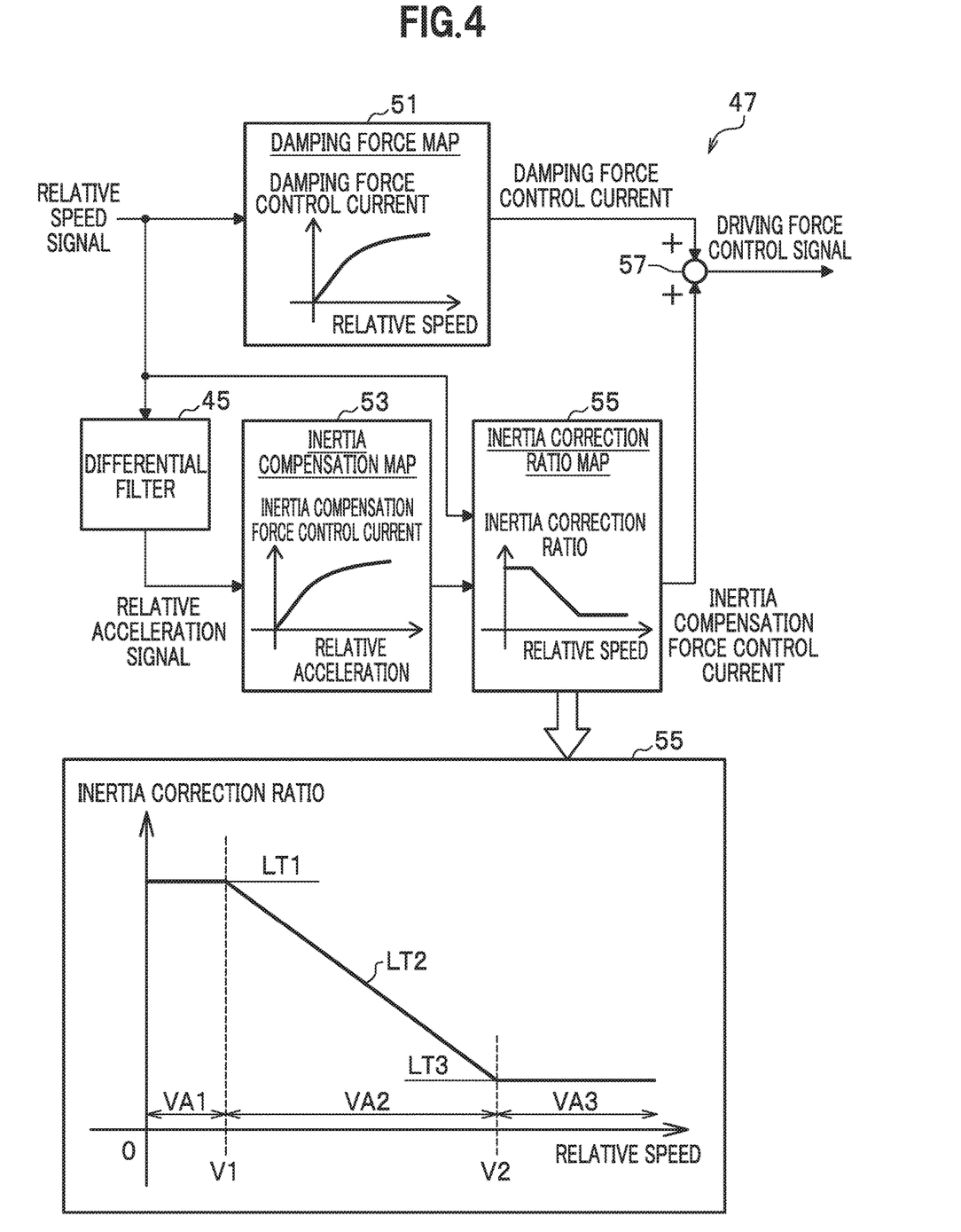
FIG. 4 is a block configuration diagram of the vicinity of a driving force calculation unit of an ECU included in an electromagnetic suspension device according to a first embodiment.

Block Configuration in Vicinity of Driving Force Calculation Unit 47 According to First Embodiment Next, the block configuration in the vicinity of the driving force calculation unit 47 of the ECU 15 included in the electromagnetic suspension device 11 according to a first embodiment (hereinafter referred to as the "driving force calculation unit 47 according to the first embodiment") will be described with reference to FIG. 4. FIG. 4 is a block configuration diagram in the vicinity of the driving force calculation unit 47 according to the first embodiment.

As illustrated in FIG. 4, the driving force calculation unit 47 according to the first embodiment includes a damping force map 51, an inertia compensation map 53, an inertia correction ratio map 55, and an adder 57.

As illustrated in FIG. 4, the damping force map 51 stores a reference value of a damping force control current which is changed in association with change in the relative speed. The driving force calculation unit 47 according to the first embodiment refers to the relative speed inputted from the relative speed calculation unit 43 and the contents stored in the damping force map 51, thereby determining a reference value of the damping force control current corresponding to the inputted relative speed.

As illustrated in FIG. 4, the inertia compensation map 53 stores a reference value of an inertia compensation force control current which is changed in association with change in the relative acceleration. The driving force calculation unit 47 according to the first embodiment refers to a relative acceleration inputted from the differential filter 45 and the contents stored in the inertia compensation map 53, thereby determining a reference value of the inertia compensation force control current corresponding to the inputted relative acceleration.

As illustrated in FIG. 4, the inertia correction ratio map 55 stores the value of inertia correction ratio which is changed in association with change in the relative speed. A value between (0 and 1 both inclusive) is used as an inertia correction ratio. The reference value of the inertia compensation force control current is multiplied by an inertia correction ratio. Thus, the reference value of the inertia compensation force control current is corrected to a value corresponding to the magnitude of a relative speed which changes every moment.

Here, the inertia correction ratio characteristics stored in the inertia correction ratio map 55 will be described with reference to FIG. 4. In a first relative speed area VA1 in which the relative speed is lower than V1 and relatively low, a fixed value "1"0 is set as the value of inertia correction ratio LT1. In a second relative speed area VA2 in which the relative speed is V1 or higher and V2 or lower as an intermediate level, a variable value, which linearly decreases as the relative speed increases, is set as the value of inertia correction ratio LT2. In a third relative speed area VA3 in which the relative speed is higher than V2 and relatively high, a fixed value "⅕ (0.2)" is set as the value of inertia correction ratio LT3.

The reason why a large inertia compensation force is set in the first relative speed area VA1 in which the relative speed is lower than V1 and relatively low is as follows. That is, in the first relative speed area VA1, a ride quality improvement effect due to the inertia compensation control is relatively greater than a ride quality improvement effect due to damping force control using a reference value of the damping force control current. In addition, the noise component in a relative acceleration signal is relatively small, the relative acceleration signal being referred to when a reference value of the inertia compensation force control current used for the inertia compensation control is calculated. Therefore, even when the amount of inertia compensation in the inertia compensation control is increased, the effect of reducing the vibration noise of the vehicle body can be expected. It is to be noted that "the amount of inertia compensation in the inertia compensation control is increased" has the same meaning as the inertia compensation force is increased.

The reason why a small inertia compensation force is set in the third relative speed area VA3 in which the relative speed is higher than V2 and relatively high is as follows. That is, in the third relative speed area VA3, a ride quality improvement effect due to the inertia compensation control is relatively less than a ride quality improvement effect due to damping force control using a reference value of the damping force control current. In addition, the noise component in a relative acceleration signal is relatively large, the relative acceleration signal being referred to when a reference value of the inertia compensation force control current used for the inertia compensation control is calculated. Therefore, the effect of reducing the vibration noise of the vehicle body can be expected by reducing the amount of inertia compensation in the inertia compensation control. It is to be noted that "reducing the amount of inertia compensation" has the same meaning as reducing the inertia compensation force.

The driving force calculation unit 47 according to the first embodiment refers to the relative speed inputted from the relative speed calculation unit 43 and the contents stored in the inertia correction ratio map 55, thereby determining an inertia correction ratio value corresponding to the inputted relative speed. Also, the driving force calculation unit 47 according to the first embodiment multiplies a reference value of the inertia compensation force control current determined by referring to the inertia compensation map 53, and an inertia correction ratio value determined by referring to the inertia correction ratio map 55 together, thereby determining the value of the inertia compensation force control current after the inertia correction is made based on the relative speed.

The adder 57 of the driving force calculation unit 47 according to the first embodiment adds the value of the inertia compensation force control current after the inertia correction based on the relative speed to the reference value of the damping force control current determined by referring to the damping force map 51, thereby generating a driving force control signal as a target, including the value of a driving force control current. Thus generated driving force control signal as a target, including the value of the driving force control current is sent to the drive controller 49. In response, the drive control unit 49 performs drive control on the multiple electromagnetic actuators 13.

Figure 5:
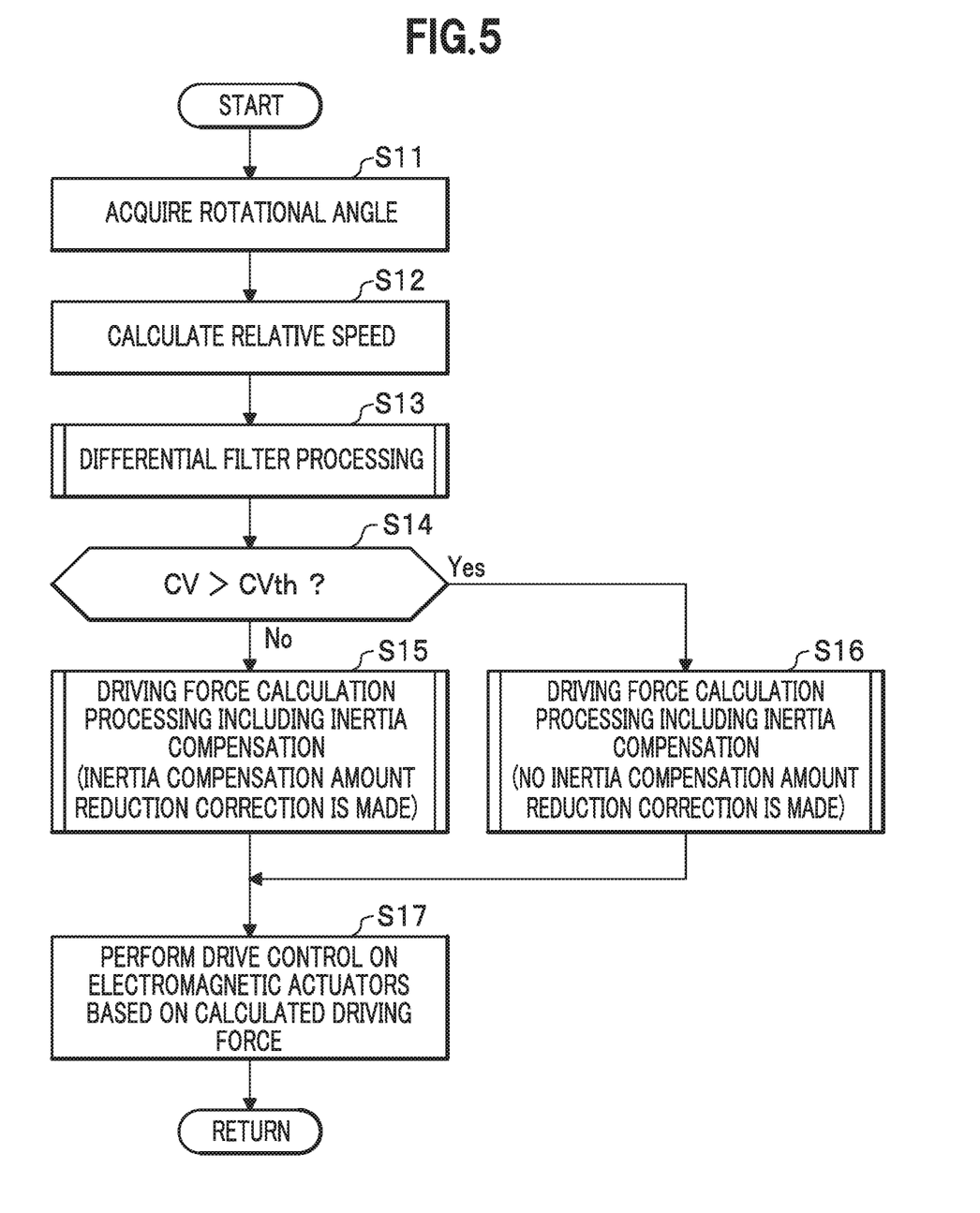
FIG. 5 is a flowchart provided for explaining the operation of the electromagnetic suspension device according to the embodiment of the present invention.
Figure 6A:
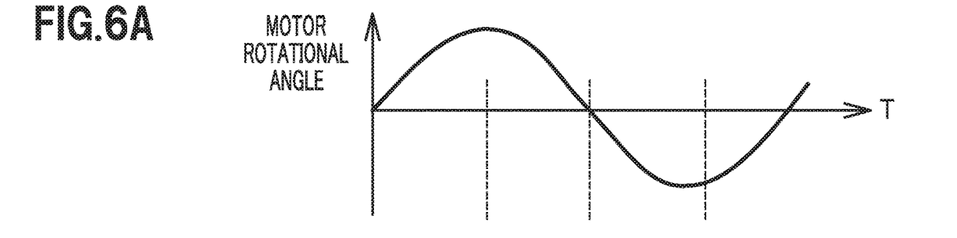
FIG. 6A is a time characteristic line diagram of a motor rotational angle.
Figure 6B:
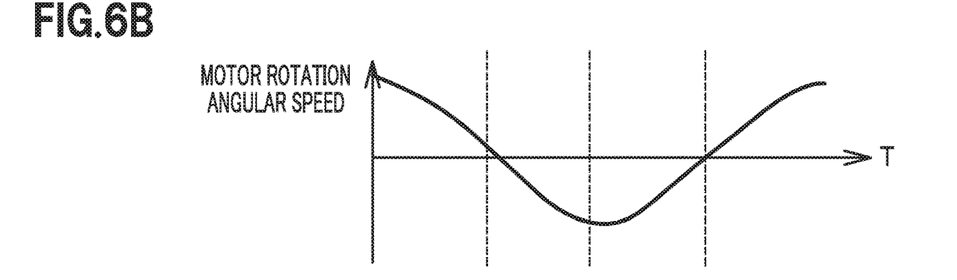
FIG. 6B is a time characteristic line diagram of a motor rotation angular speed.
Figure 6C:
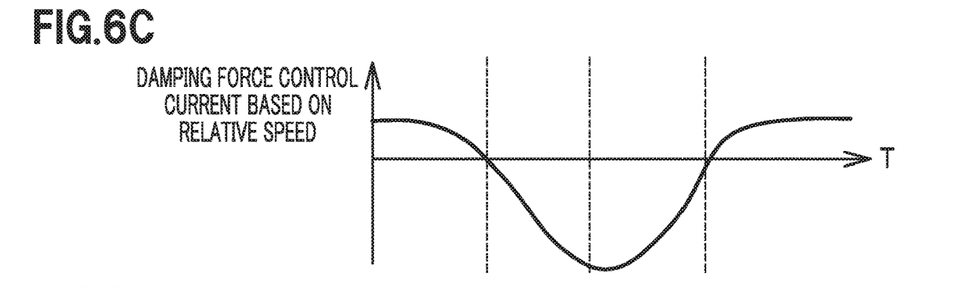
FIG. 6C is a time characteristic line diagram of a damping force control current based on a relative speed.
Figure 6D:
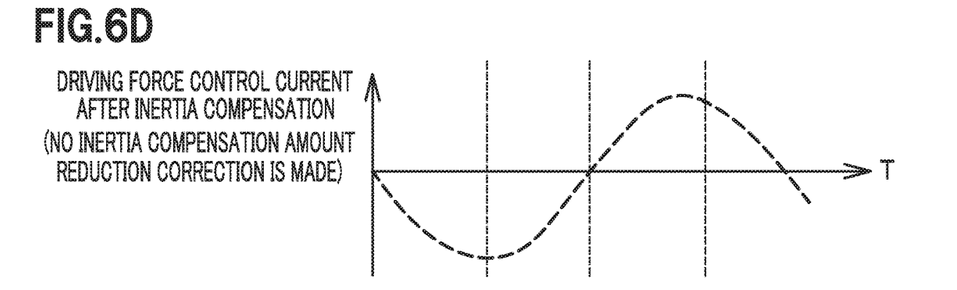
FIG. 6D is a time characteristic line diagram of a driving force control current (no inertia correction is made) after inertia compensation.
Figure 6E:
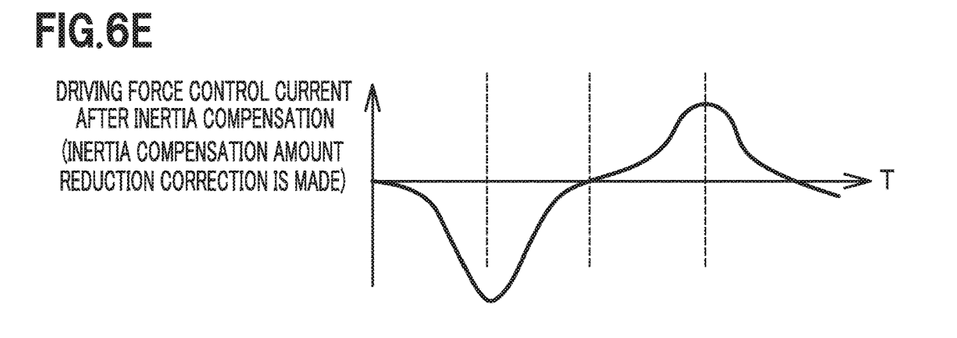
FIG. 6E is a time characteristic line diagram of a driving force control current (inertia correction is made) after inertia compensation.

Operation of Electromagnetic Suspension Device 11 According to Embodiment of Present Invention Next, the operation of the electromagnetic suspension device 11 according to the embodiment of the present invention will be described with reference to FIGS. 5, 6A to 6E. FIG. 5 is a flowchart provided for explaining the operation of the electromagnetic suspension device according to 11 to the embodiment of the present invention. FIG. 6A is a time characteristic line diagram of a motor rotational angle. FIG. 6B is a time characteristic line diagram of a motor rotation angular speed. FIG. 6C is a time characteristic line diagram of a damping force control current based on a relative speed. FIG. 6D is a time characteristic line diagram of a driving force control current (no inertia correction is made) after inertia compensation. FIG. 6E is a time characteristic line diagram of a driving force control current (inertia correction is made) after inertia compensation.

In step S11 illustrated in FIG. 5, the rotational angle acquisition unit 41 of the ECU 15 acquires a rotational angle signal (see FIG. 6A) of the electric motor 31 detected by the resolver 37. The rotational angle signal of the electric motor 31 acquired by the rotational angle acquisition unit 41 is sent to the relative speed calculation unit 43.

In step S12, the relative speed calculation unit 43 of the ECU 15 calculates a relative speed (a motor rotational angle speed, see FIG. 6B) between the above-spring member and below-spring member of the vehicle 10 by differentiating the rotational angle of the electric motor 31 acquired in step S11 with respect to time. Thus calculated relative speed signal is sent to both the differential filter 45 and the driving force calculation unit 47.

In step S13, the differential filter 45 of the ECU 15 receives input of the relative speed signal calculated in step S12, and performs differential filter processing on the relative speed signal using a predetermined gain frequency characteristics (high pass characteristics), thereby outputting a relative acceleration signal. The relative acceleration signal outputted from differential filter 45 is sent to the driving force calculation unit 47.

In step S14, the ECU 15 acquires the vehicle speed CV, and determines whether or not vehicle the acquired vehicle speed CV is higher than a predetermined vehicle speed threshold CVth. A speed, by which the vehicle speed CV may be considered to be high, is appropriately set as the vehicle speed threshold CVth.

As a result of the determination in step S14, when the vehicle speed CV is determined not to be higher than the vehicle speed threshold CVth ("No" in step S14), the ECU 15 causes the processing flow to proceed to the next step S15. On the other hand, when the vehicle speed CV is determined to be higher than the vehicle speed threshold CVth ("Yes" in step S14), the ECU 15 causes the processing flow to jump to step S16.

In step S15, the driving force calculation unit 47 of ECU 15 receives input of a relative speed signal and a relative acceleration signal, refers to these both signals, the damping force map 51, the inertia compensation map 53, and the inertia correction ratio map 55 and performs driving force calculation processing including inertia compensation (inertia compensation amount reduction correction is made), thereby determining a driving force control signal as a target, including the value of the driving force control current.

More specifically, the driving force calculation unit 47 according to the first embodiment refers to the relative speed inputted from the relative speed calculation unit 43 and the contents stored in the damping force map 51 (the value of a damping force control current which is changed in association with change in the relative speed), thereby determining a reference value of the damping force control current (see FIG. 6C) corresponding to the inputted relative speed.

Subsequently, the driving force calculation unit 47 according to the first embodiment refers to the relative acceleration inputted from the differential filter 45 and the contents stored in the inertia compensation map 53 (the reference value of inertia compensation force control current which is changed in association with change in the relative acceleration), thereby determining a reference value of the inertia compensation force control current corresponding to the inputted relative acceleration.

Subsequently, the driving force calculation unit 47 according to the first embodiment refers to the relative speed inputted from the relative speed calculation unit 43 and the contents stored in the inertia correction ratio map 55 (the value of an inertia correction ratio which is changed in association with change in the relative speed), thereby determining an inertia correction ratio value corresponding to the inputted relative speed. Also, the driving force calculation unit 47 according to the first embodiment multiplies a reference value of the inertia compensation force control current determined by referring to the inertia compensation map 53, and an inertia correction ratio value determined by referring to the inertia correction ratio map 55 together, thereby determining the value of the inertia compensation force control current (see FIG. 6E, inertia correction is made).

Subsequently, the adder 57 of the driving force calculation unit 47 according to the first embodiment adds the value of the inertia compensation force control current after the inertia correction to the reference value of the damping force control current determined by referring to the damping force map 51, thereby generating a driving force control signal as a target, including the value of a driving force control current.

In step S16, the driving force calculation unit 47 of ECU 15 receives input of a relative speed signal and a relative acceleration signal, refers to these both signals, the damping force map 51, and the inertia compensation map 53 and performs driving force calculation processing including inertia compensation (no inertia compensation amount reduction correction is made), thereby determining a driving force control signal as a target, including the value of the driving force control current.

More specifically, the driving force calculation unit 47 according to the first embodiment refers to the relative speed inputted from the relative speed calculation unit 43 and the contents stored in the damping force map 51 (the value of a damping force control current which is changed in association with change in the relative speed), thereby determining a reference value of the damping force control current (see FIG. 6C) corresponding to the inputted relative speed.

Subsequently, the driving force calculation unit 47 according to the first embodiment refers to the relative acceleration inputted from the differential filter 45 and the contents stored in the inertia compensation map 53 (the reference value of inertia compensation force control current which is changed in association with change in the relative acceleration), thereby determining a reference value of the inertia compensation force control current corresponding to the inputted relative acceleration.

Subsequently, the driving force calculation unit 47 according to the first embodiment multiplies a reference value of the inertia compensation force control current determined by referring to the inertia compensation map 53 and "1" together, which is the default value of the inertia ratio map 55 (in the case where the vehicle speed CV is determined to be higher than the vehicle speed threshold CVth), thereby determining the value of the inertia compensation force control current (see FIG. 6D, no inertia correction is made).

Subsequently, the adder 57 of the driving force calculation unit 47 according to the first embodiment adds the value of the inertia compensation force control current to the reference value of the damping force control current determined by referring to the damping force map 51, thereby generating a driving force control signal as a target, including the value of a driving force control current.

In step S17, the drive controller 49 of the ECU 15 supplies drive control power to the electric motor 31 included in each of the multiple electromagnetic actuators 13 in accordance with the driving force control signal determined by the calculation in step S15 or S16, thereby performing drive control of the multiple electromagnetic actuators 13.

With the electromagnetic suspension device 11 according to the first embodiment, an inertia correction ratio value corresponding to the relative speed is determined by referring to the inertia correction ratio map 55, and an inertia compensation force as a reference (a reference value of the damping force control current) is corrected using the inertia correction ratio value thus calculated, and therefore finely tuned correction of the inertia compensation force according to the magnitude of the relative speed can be made. Consequently, it is possible to achieve both the effect of improving the ride quality of the vehicle 10 based on the inertia compensation control and the effect of reducing the vibration noise of the vehicle body at a high level.

Figure 7:
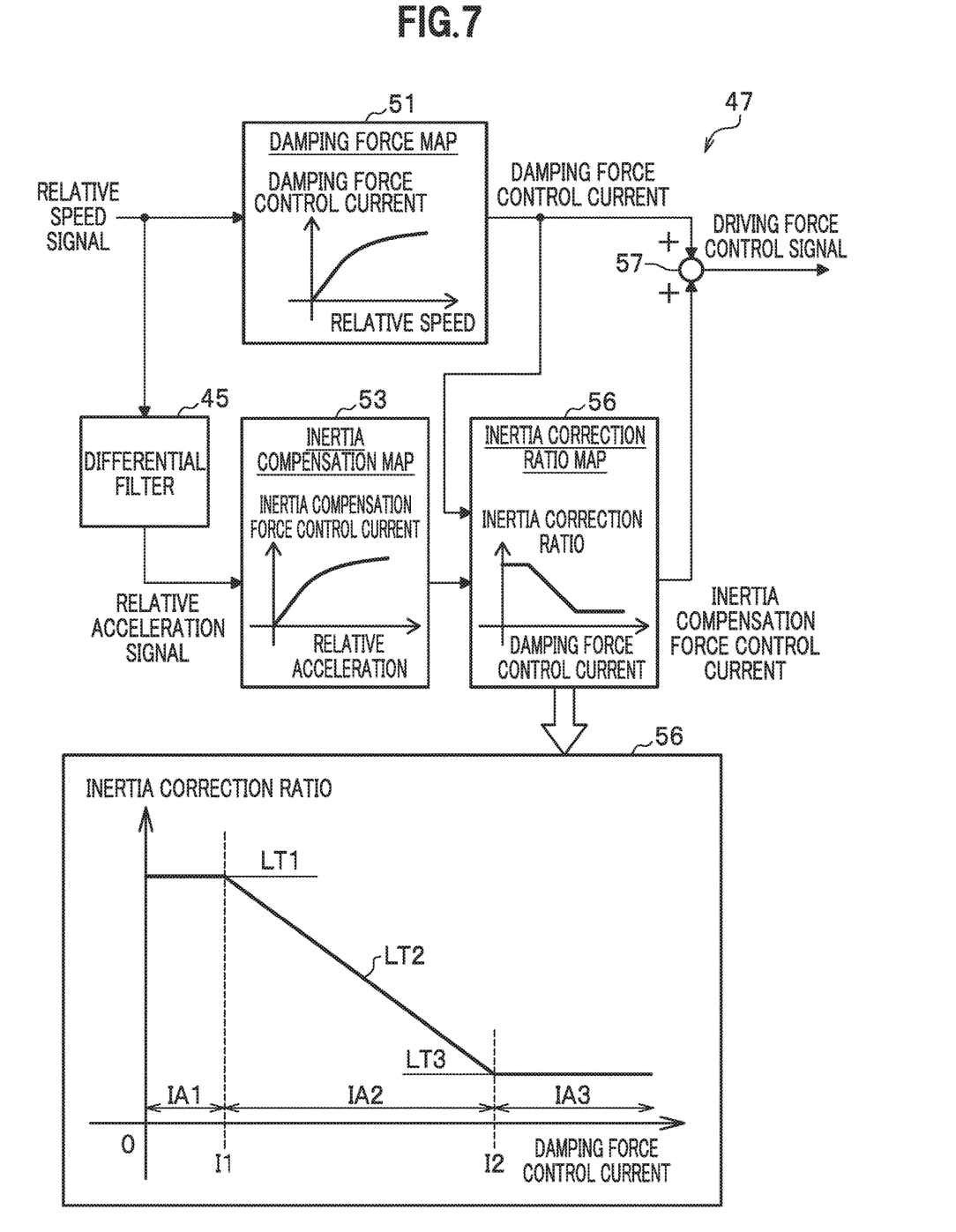
FIG. 7 is a block configuration diagram of the vicinity of a driving force calculation unit of an ECU included in an electromagnetic suspension device according to a second embodiment.

Block Configuration in Vicinity of Driving Force Calculation Unit 47 According to Second Embodiment Next, the block configuration in the vicinity of the driving force calculation unit 47 of the ECU 15 included in the electromagnetic suspension device 11 according to a second embodiment (hereinafter referred to as the "driving force calculation unit 47 according to the second embodiment") will be described with reference to FIG. 7. FIG. 7 is a block configuration diagram in the vicinity of the driving force calculation unit 47 according to the second embodiment.

Here, the driving force calculation unit 47 according to the first embodiment and the driving force calculation unit 47 according to the second embodiment have many common components between the driving force calculation units 47. Thus, attention is focused on different components between the driving force calculation units 47, and the different components will be described rather than the driving force calculation unit 47 according to the second embodiment.

As illustrated in FIG. 7, the driving force calculation unit 47 according to the second embodiment includes a damping force map 51, an inertia compensation map 53, an inertia correction ratio map 56, and an adder 57. Here, it should be noted that the configuration of the inertia correction ratio map 56 according to the second embodiment is different from the configuration of the inertia correction ratio map 55 according to the first embodiment.

As illustrated in FIG. 7, the inertia correction ratio map 56 according to the second embodiment stores the value of inertia correction ratio which is changed in association with change in the damping force control current. A value between (0 and 1 both inclusive) is used as an inertia correction ratio. The reference value of the inertia compensation force control current is multiplied by an inertia correction ratio. Thus, the reference value of the inertia compensation force control current is corrected to a value corresponding to the magnitude of a damping force control current which changes every moment. It is to be noted that the "relative speed correlation value" of the present invention is a concept including both the relative speed itself and the damping force control current which is a parameter correlated with the relative speed.

Here, the inertia correction ratio characteristics stored in the inertia correction ratio map 56 will be described with reference to FIG. 7. In a first damping force control current area LA1 in which the damping force control current is lower than I1 and relatively low, a fixed value "1" is set as the value of inertia correction ratio LT1. In a second damping force control current area IA2 in which the damping force control current is I1 or higher and I2 or lower as an intermediate level, a variable value, which linearly decreases as the damping force control current increases, is set as the value of inertia correction ratio LT2. In a third damping force control current area IA3 in which the damping force control current is higher than I2 and relatively high, a fixed value "⅕ (0.2)" is set as the value of inertia correction ratio LT3.

The reason why a large inertia compensation force is set in the first damping force control current area IA1 in which the damping force control current is lower than I1 and relatively low is as follows. That is, in the first damping force control current area LA1, a ride quality improvement effect due to the inertia compensation control is relatively greater than a ride quality improvement effect due to damping force control using a reference value of the damping force control current. In addition, the noise component in a relative acceleration signal is relatively small, the relative acceleration signal being referred to when a reference value of the inertia compensation force control current used for the inertia compensation control is calculated. Therefore, even when the amount of inertia compensation in the inertia compensation control is increased, the effect of reducing the vibration noise of the vehicle body can be expected.

The reason why a small inertia compensation force is set in the third damping force control current area IA3 in which the damping force control current is higher than I2 and relatively high is as follows. That is, in the third damping force control current area IA3, a ride quality improvement effect due to the inertia compensation control is relatively less than a ride quality improvement effect due to damping force control using a reference value of the damping force control current. In addition, the noise component in a relative acceleration signal is relatively large, the relative acceleration signal being referred to when a reference value of the inertia compensation force control current used for the inertia compensation control is calculated. Therefore, the effect of reducing the vibration noise of the vehicle body can be expected by reducing the amount of inertia compensation in the inertia compensation control.

The driving force calculation unit 47 according to the second embodiment refers to the reference value of the damping force control current determined by referring to the damping force map 51 and the contents stored in the inertia correction ratio map 56, thereby determining an inertia correction ratio value corresponding to the inputted damping force control current. Also, the driving force calculation unit 47 according to the second embodiment multiplies a reference value of the inertia compensation force control current determined by referring to the inertia compensation map 53, and an inertia correction ratio value determined by referring to the inertia correction ratio map 56 together, thereby determining the value of the inertia compensation force control current.

The adder 57 of the driving force calculation unit 47 according to the second embodiment adds the value of the inertia compensation force control current to the reference value of the damping force control current determined by referring to the damping force map 51, thereby generating a driving force control signal as a target, including the value of a driving force control current. Thus generated driving force control signal as a target, including the value of the driving force control current is sent to the drive controller 49 which performs drive control of the multiple electromagnetic actuators 13.

With the electromagnetic suspension device 11 according to the second embodiment, an inertia correction ratio value corresponding to the damping force control current (a damping force of viscous control is generated) is determined by referring to the inertia correction ratio map 56, and an inertia compensation force as a reference (a reference value of the damping force control current) is corrected using the inertia correction ratio value thus calculated, and therefore finely tuned correction of the inertia compensation force according to the magnitude of the damping force control current can be made. Consequently, similarly to the electromagnetic suspension device 11 according to the first embodiment, it is possible to achieve both the effect of improving the ride quality of the vehicle 10 based on the inertia compensation control and the effect of reducing the vibration noise of the vehicle body at a high level.

Configuration of Differential Filter 45 According to Modification

Figure 8:
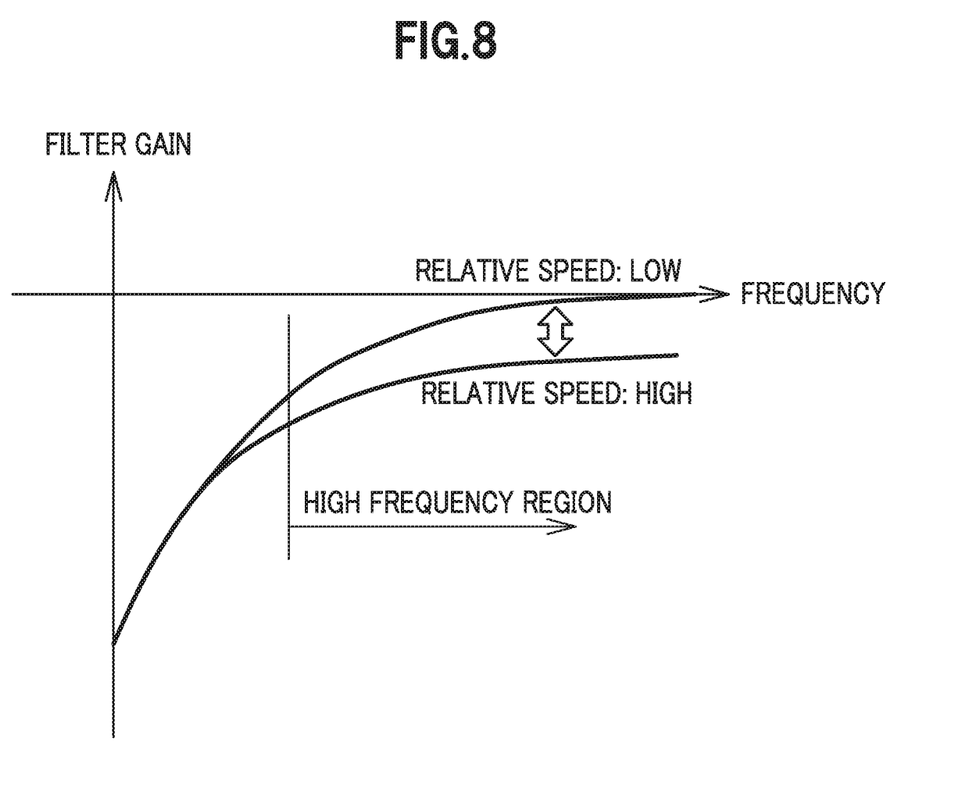
FIG. 8 is a frequency characteristic diagram of a differential filter according to a modification.

Next, the configuration of differential filter 45 according to a modification will be described with reference to FIG. 8. FIG. 8 is a frequency characteristic diagram of the differential filter 45 according to a modification.

In the differential filter 45 according to the embodiment described above, high pass characteristics are set as the gain frequency characteristics. In contrast, as illustrated in FIG. 8, the differential filter 45 according to the modification is configured to change the gain frequency characteristics according to the magnitude of relative speed in addition to the high pass characteristics in a high frequency region.

In short, as illustrated in FIG. 8, in the differential filter 45 according to the modification, in a high frequency region, when the relative speed is high, low gain frequency characteristics are set, whereas when the relative speed is low, high gain frequency characteristics are set.

The differential filter 45 according to the modification is applicable to both the electromagnetic suspension device 11 according to the first embodiment and the electromagnetic suspension device 11 according to the second embodiment.

Operation of Differential Filter 45 According to Modification

The differential filter 45 according to the modification receives input of the relative speed signal calculated by the relative speed calculation unit 43, sets gain frequency characteristics according to the relative speed, performs differential filter processing on the relative speed signal using the set gain frequency characteristics, thereby outputting a relative acceleration signal. The relative acceleration signal outputted from the differential filter 45 is sent to the driving force calculation unit 47.

Time series data of relative speed which changes every moment in magnitude is inputted to the differential filter 45 according to the modification. Here, as a situation in which time series data of relative speed belongs to a high frequency region, for instance, a case where the vehicle 10 is running on an uneven road like a stone pavement may be considered. Also, as a situation when the relative speed is high, it is assumed that a relatively high impact is inputted to a wheel of the vehicle 10. Furthermore, as a situation when the relative speed is low, for instance, it is assumed that the vehicle 10 is running on a flat road.

In short, for instance, in a case where the vehicle 10 is running on an uneven road like a stone pavement (time series data of relative speed belongs to a high frequency region), when a relatively high impact is inputted to a wheel of the vehicle 10 (the relative speed is high), the differential filter 45 according to the modification outputs a relatively small acceleration signal by setting low gain frequency characteristics. Thus, the inertia compensation force is decreased.

On the other hand, for instance, in a case where the vehicle 10 is running on a flat road (the relative speed is low), the differential filter 45 outputs a relatively large acceleration signal by setting high gain frequency characteristics. Thus, the inertia compensation force is increased.

Since the differential filter 45 according to the modification changes the gain frequency characteristics according to the magnitude of relative speed, it is possible to finely tune gain adjustment according to the magnitude of the frequency presented by relative speed time series data. Consequently, the effect of strongly reducing high frequency noise components can be expected.

Operational Effect of Electromagnetic Suspension Device 11 According to Embodiment of Present Invention Next, the operational effect of the electromagnetic suspension device 11 according the embodiment of the present invention will be described.

If the inertia compensation force as a reference (a reference value of the damping force control current) is not corrected by using a determined inertia correction ratio value corresponding to a relative speed in the configuration of the electromagnetic suspension device 11 according to the embodiment of the present invention, then in this case, in the electromagnetic suspension device 11, during the inertia compensation control, electromagnetic noise, which inevitably occurs in an inverter control circuit (not illustrated), included in the ECU 15, for generating a drive control power to be supplied to the electric motor 31, comes around a processing circuit (not illustrated), included in the ECU 15, for a rotational angle signal of the electric motor 31 detected by the resolver 37.

Then, the electromagnetic noise, which has occurred in the inverter control circuit, is added to the rotational angle signal of the electric motor 31, and the noise may cause vibration noise of the vehicle body. In particular, when the rotational angle signal is converted to an angular speed signal/angular acceleration signal for use by performing differential processing on the rotational angle signal of the electric motor 31, the noise component added to the rotational angle signal of the electric motor 31 is amplified in a process of the differential processing. As a result, there is a possibility of amplification of vibration noise of the vehicle body.

Then, an electromagnetic suspension device 11 according to a first aspect includes: an electromagnetic actuator 13 that is disposed along with a spring member installed between a vehicle body and a wheel of a vehicle 10, and that generates a driving force related to vibration damping of the vehicle body; a state quantity acquisition unit (the rotational angle acquisition unit 41, the relative speed calculation unit 43, and the differential filter 45) that acquires a state quantity related to the electromagnetic actuator 13; an ECU (driving force controller) 15 that performs driving force control including damping control and inertia compensation control of the electromagnetic actuator 13 based on the state quantity acquired by the state quantity acquisition unit; and a relative speed correlation value acquisition unit (corresponding to the relative speed calculation unit 43) that acquires a correlation value of a relative speed between an above-spring member and a below-spring member with respect to the spring member in the vehicle body.

The ECU (driving force controller) 15 performs driving force control including inertia compensation control of the electromagnetic actuator 13 based on a derivative value (the rotational angle acceleration of the electric motor 31 having a strong correlation with the relative acceleration) of the state quantity (the rotational angle speed of electric motor 31 having a strong correlation with the relative speed), and in an area in which the relative speed correlation value (relative speed/damping force control current) acquired by the relative speed correlation value acquisition unit exceeds a predetermined relative speed correlation threshold, the driving force controller makes correction to decrease an amount of inertia compensation by the inertia compensation control, as compared with an area in which the relative speed correlation value is less than or equal to the relative speed correlation threshold.

More specifically, as illustrated in FIG. 4, the ECU (driving force controller) 15 according to the first embodiment sets a large inertia compensation force in the first relative speed area VA1 in which the relative speed (an aspect of the relative speed correlation value) is lower than V1 and relatively low. In other words, in the second relative speed area VA2 in which the relative speed is V1 or higher and V2 or lower as an intermediate level, a small inertia compensation force is set by correcting the amount of inertia compensation by the inertia compensation control so that the amount of inertia compensation is decreased, as compared with the first relative speed area VA1.

Also, as illustrated in FIG. 4, the ECU 15 according to the first embodiment sets a small inertia compensation force in the third relative speed area VA3 in which the relative speed is higher than V2 and relatively high, by correcting the amount of inertia compensation by the inertia compensation control so that the amount of inertia compensation is decreased, as compared with the second relative speed area VA2.

Also, as illustrated in FIG. 7, the ECU (driving force controller) 15 according to the second embodiment sets a large inertia compensation force in the first damping force control current area IA1 in which the damping force control current (an aspect of the relative speed correlation value) is lower than I1 and relatively low. In other words, in the second damping force control current area IA2 in which the damping force control current is I1 or higher and I2 or lower as an intermediate level, a small inertia compensation force is set by correcting the amount of inertia compensation by the inertia compensation control so that the amount of inertia compensation is decreased, as compared with the first damping force control current area IA1.

Also, as illustrated in FIG. 7, the ECU 15 according to the first embodiment sets a small inertia compensation force in the third damping force control current area IA3 in which the damping force control current is higher than I2 and relatively high, by correcting the amount of inertia compensation by the inertia compensation control so that the amount of inertia compensation is decreased, as compared with the second damping force control current area IA2.

With the electromagnetic suspension device 11 according to the first aspect, even when inertia compensation control is in operation, it is possible to achieve both the effect of improving the ride quality of the vehicle based on the inertia compensation control and the effect of reducing the vibration noise of the vehicle body at a high level.

Also, an electromagnetic suspension device 11 according to a second aspect is the electromagnetic suspension device 11 according to the first aspect, and as illustrated in FIG. 4, in an area (the first relative speed area VA1) in which the relative speed correlation value (the relative speed) acquired by the relative speed correlation value acquisition unit is less than a first relative speed correlation threshold (V1), the ECU (driving force control unit) 15 according to the first embodiment corrects the amount of inertia compensation by the inertia compensation control so that the amount of inertia compensation is increased, as compared with an area (the second relative speed area VA2) in which the relative speed correlation value (the relative speed) is greater than or equal to the first relative speed correlation threshold (V1), whereas in an area (the third relative speed area VA3) in which the relative speed correlation value (the relative speed) exceeds a second relative speed correlation threshold (V2) which is greater than the first relative speed correlation threshold (V1), the ECU 15 corrects the amount of inertia compensation by the inertia compensation control so that the amount of inertia compensation is decreased, as compared with an area (the second relative speed area VA2) in which the relative speed correlation value (the relative speed) is less than or equal to the second relative speed correlation threshold (V2).

Also, as illustrated in FIG. 7, in an area (the first damping force control current area IA1) in which the relative speed correlation value (damping force control current) acquired by the relative speed correlation value acquisition unit is less than a first relative speed correlation threshold (I1), the ECU (driving force control unit) 15 according to the first embodiment corrects the amount of inertia compensation by the inertia compensation control so that the amount of inertia compensation is increased, as compared with an area (the second damping force control current area IA2) in which the relative speed correlation value (damping force control current) is greater than or equal to the first relative speed correlation threshold (I1), whereas in an area (the third damping force control current area IA3) in which the relative speed correlation value (damping force control current) exceeds a second relative speed correlation threshold (I2) which is greater than the first relative speed correlation threshold (I1), the ECU 15 corrects the amount of inertia compensation by the inertia compensation control so that the amount of inertia compensation is decreased, as compared with an area (the second damping force control current area IA2) in which the relative speed correlation value (damping force control current) is less than or equal to the second relative speed correlation threshold (I2).

In contrast to the electromagnetic suspension device 11 according to the first aspect, with the electromagnetic suspension device 11 according to the second aspect, even when inertia compensation control is in operation, it is possible to achieve both the effect of improving the ride quality of the vehicle based on the inertia compensation control and the effect of reducing the vibration noise of the vehicle body at an even higher level.

Also, an electromagnetic suspension device 11 according to a third aspect is the electromagnetic suspension device 11 according to the first or second aspect, further including a vehicle speed sensor (vehicle speed detector) 40 that detects a vehicle speed CV of the vehicle 10. When the vehicle speed CV exceeds a predetermined vehicle speed threshold CVth, the ECU (driving force controller) 15 corrects the amount of inertia compensation by the inertia compensation control so that the amount of inertia compensation is increased, as compared with when the vehicle speed CV is less than or equal to the vehicle speed threshold CVth.

Here, as a situation when the vehicle speed CV exceeds a predetermined vehicle speed threshold CVth, it is assumed that the vehicle 10 is running at a high speed. In such a situation of high speed running, the vibration noise level based on inertia compensation control of the electromagnetic actuator 13 is smaller than a level of vibration noise, including wind noise, and road noise, which accompanies the high speed running of the vehicle 10. As a result, fewer requests of decreasing the amount of inertia compensation of inertia compensation control by inertia correction are made.

Thus, when the vehicle speed CV exceeds a predetermined vehicle speed threshold CVth, the electromagnetic suspension device 11 according to the third aspect corrects the amount of inertia compensation by the inertia compensation control so that the amount of inertia compensation is increased, as compared with when the vehicle speed CV is less than or equal to the vehicle speed threshold CVth.

With the electromagnetic suspension device 11 according to the third aspect, the intensity of inertia compensation control is adjustable according to the magnitude of the vehicle speed CV, and thus it is possible to enhance the effect of improving the ride quality of the vehicle 10 based on the inertia compensation control of the electromagnetic actuator 13 in a situation of high speed running.

Other Embodiments

The multiple embodiments described above illustrate examples of implementation of the present invention. Therefore, a technical scope of the present invention is not to be taken in a limited sense. The present invention may be implemented in various forms without departing from the gist or primary characteristics of the invention.

For instance, in the description of the embodiments according to the present invention, an example has been illustrated in which the electromagnetic actuator 13 is disposed in each of the wheels including the front wheels (the left front wheel and the right front wheel), and the rear wheels (the left rear wheel and the right rear wheel), that is, four electromagnetic actuators 13 are disposed. However, the present invention is not limited to this example. A configuration may be adopted, in which the electromagnetic actuator 13 is disposed in one of the front wheels and one of the rear wheels, that is, two electromagnetic actuators may be disposed.

Also, in the description of the electromagnetic suspension device 11 according to the first embodiment of the present invention, an example has been illustrated in which the magnitude of inertia correction amount is changed according to whether or not the vehicle speed CV exceeds the vehicle speed threshold CVth. However, the present invention is not limited to this example. The example, in which the magnitude of inertia correction amount is changed according to whether or not the vehicle speed CV exceeds the vehicle speed threshold CVth, may be applied to the electromagnetic suspension device 11 according to the second embodiment.

Also, in the description of the electromagnetic suspension device 11 according to the embodiment of the present invention, values considered to be appropriate have been exemplified as the correction ratio values LT1 to LT3. However, the present invention is not limited to this example. Appropriateness values obtained by an experiment or a simulation may be used as the correction ratio values LT1 to LT3.

Lastly, in the description of the embodiments of the present invention, an example has been illustrated in which the relative speed calculation unit 43 has both functions of the rotational angle acceleration calculation unit that calculates a rotational angle acceleration of the electric motor 31 based on a rotational angle acquired by the rotational angle acquisition unit 41, and the relative speed correlation value acquisition unit that acquires a correlation value of a relative speed between the above-spring member and the below-spring member with respect to the spring member in the vehicle body. However, the present invention is not limited to this example. A configuration may be adopted, in which both functions of the rotational angle acceleration calculation unit and the relative speed correlation value acquisition unit are implemented by independent functional units.

What is claimed is:

1. An electromagnetic suspension device comprising:
    an electromagnetic actuator that is disposed along with a spring member installed between a vehicle body and a wheel of a vehicle, and that generates a driving force related to vibration damping of the vehicle body;
    a state quantity acquisition unit that acquires a state quantity related to the electromagnetic actuator;
    a driving force controller that performs driving force control including inertia compensation control of the electromagnetic actuator, the inertia compensation control being performed based on a derivative value of the state quantity; and
    a relative speed acquisition unit that acquires a relative speed between an above-spring member and a below-spring member,
    wherein the driving force controller corrects an amount of inertia compensation performed by the inertia compensation control to decrease the amount of inertia compensation when the relative speed exceeds a predetermined relative speed threshold value.

2. The electromagnetic suspension device according to claim 1,
    wherein when the relative speed acquired by the relative speed acquisition unit is less than a first relative speed threshold, the driving force controller corrects the amount of inertia compensation by the inertia compensation control so that the amount of inertia compensation is increased, as compared with when the relative speed is greater than or equal to the first relative speed threshold,
    whereas the relative speed exceeds a second relative speed threshold which is greater than the first relative speed threshold, the driving force controller corrects the amount of inertia compensation by the inertia compensation control so that the amount of inertia compensation is decreased, as compared with when the relative speed correlation value is less than or equal to the second relative speed threshold.

3. The electromagnetic suspension device according to claim 1, further comprising
    a vehicle speed detector that detects a vehicle speed of the vehicle,
    wherein when the vehicle speed exceeds a predetermined vehicle speed threshold, the driving force controller corrects the amount of inertia compensation by the inertia compensation control so that the amount of inertia compensation is increased, as compared with when the vehicle speed is less than or equal to the vehicle speed threshold.

4. The electromagnetic suspension device according to claim 2, further comprising
    a vehicle speed detector that detects a vehicle speed of the vehicle,
    wherein when the vehicle speed exceeds a predetermined vehicle speed threshold, the driving force controller corrects the amount of inertia compensation by the inertia compensation control so that the amount of inertia compensation is increased, as compared with when the vehicle speed is less than or equal to the vehicle speed threshold.

* * * * *